United States Patent [19]

Lee

[11] 4,352,907
[45] Oct. 5, 1982

[54] POLYETHYLENETEREPHTHALATE TERNARY BLENDS

[75] Inventor: Chung J. Lee, Sheboygan, Wis.

[73] Assignee: Plastics Engineering Company, Sheboygan, Wis.

[21] Appl. No.: 234,860

[22] Filed: Feb. 17, 1981

[51] Int. Cl.$^3$ .................. C08L 67/02; C08K 3/40
[52] U.S. Cl. .................. 524/537; 524/449; 525/439; 525/444
[58] Field of Search .............. 525/439, 444; 260/40 R

[56] References Cited

U.S. PATENT DOCUMENTS 3,651,172  3/1972  Barkey et al. .............. 525/444
4,113,692  9/1978  Wainbach .............. 525/439

Primary Examiner—Wilbert J. Briggs, Sr.
Attorney, Agent, or Firm—Walter J. Monacelli

[57] ABSTRACT

The compositions disclosed herein comprise blends of polyethyleneterephthalate (PET) having improved impact strength and heat resistance without any sacrifice of other properties such as flexural strength, humidity resistance, low mold shrinkage, etc. These compositions comprise ternary blends of 30–95 percent, preferably 35–95 percent by weight of PET, 1–30 percent, preferably 3–15 percent by weight of an aromatic polycarbonate (PC); and 1–12, preferably 2.5–10 percent of a copolyester of terephthalic acid with ethylene glycol and cyclohexane-1,4-dimethanol.

12 Claims, No Drawings

POLYETHYLENETEREPHTHALATE TERNARY BLENDS

BACKGROUND OF THE INVENTION

1. Field of the Invention

This invention relates to polyethyleneterephthalate blends having high flexural strength, high humidity resistance, low mold shrinkage and improved impact strength and long-term heat resistance. More specifically, it relates to such blends which also contain an aromatic polycarbonate and a copolyester of terephthalic acid with ethylene glycol and cyclohexane-1,4-dimethanol.

2. State of the Prior Art

Various commercial fiberglass or mica filled PET compounds exhibit a number of weaknesses which may be attributed to the matrix resin. For example, these commercial materials have high mold shrinkage and warpage upon post-heating and low impact strength and brittleness upon even short term exposure to high temperatures. These defects are inherited from the PET matrix resin.

When particulate or plate-like fillers are added the mold shrinkage and warpage is partially reduced but there is a sacrifice in toughness, heat distortion and other mechanical properties such as tensile and flexural strengths. For example the commercial PET product sold under the trademark Rynite RE 5060 is filled with 35 percent of a combination of fiberglass and mica and the product sold under the trademark Rynite 530 has 30 percent fiberglass. In comparison, the mica-containing Rynite RE 5060 has less than 70 percent of the flexural, notched impact and tensile strength of the Rynite 530. Moreover, the mica-containing product has a heat distortion temperature of 400° F. as compared to the 420° F. of the Rynite 530.

Attempts to improve the impact strength of PET by blending with other high impact elastomeric or thermoplastic materials result in a lowering of the heat distortion temperature and also of the mechanical properties. For example, the commercial product Ropet R 400, which comprises an acrylic-PET blend, shows better low temperature toughness (1.8 vs. 0.8 ft-lb/in notched Izod impact) and less warpage than Rynite 530. However, the Ropet R 400 has both lower heat distortion (425° F. vs. 435° F.) and lower tensile strength (16,500 psi vs. 23,000 psi) than Rynite 530. Since both of these commercial products contain 30 percent fiberglass, it may be assumed that the property differences are derived from the matrix systems.

A number of U.S. Pat. Nos., for example, 4,105,150; 4,119,607; 4,172,859 and 4,195,000 disclose blends of PET with various elastomers or rubbery materials, including a hydrogenated monoalkenylarene-diene block copolymer, butadiene block copolymers, etc. However these compositions suffered substantial loss in stiffness and mechanical strengths.

U.S. Pat. No. 3,218,372 discloses a PET/PC binary blend. This composition has very poor flow properties when more than 7.5 percent of the aromatic polycarbonate is used, and moreover the blend has poorer heat resistance than the PET per se.

SUMMARY OF THE INVENTION

In accordance with the present invention, it has been found that impact strength and high heat resistance are improved with no sacrifice in high flexural strength, humidity resistance, low mold shrinkage and warpage, and tensile strength in a ternary blend comprising 30-95 parts, preferably 35-95 parts by weight of polyethyleneterephthlate, 1-30 parts, preferably 3-15 parts by weight of an aromatic polycarbonate and 1-40 parts, and 1-12, preferably 2.5-10 parts by weight of a copolyester of terephthalic acid with ethylene glycol and cyclohexane-1,4-dimethanol with the total of the three components totaling 100 parts. The copolyester is advantageously formed of 10-90 molar percent, preferably 20-80 molar percent derived from ethylene glycol and 90-10, preferably 80-20 molar percent from cyclohexane-1,4-dimethanol, with the combined total representing 100 molar percent.

In referring to said polymers containing various percentages of the respective starting materials, it means that these percentages represent approximately the residues from said starting materials which are incorporated as repeating units in the respective polymer molecules.

In other words, it has been found that the aforementioned copolyester is particularly effective in improving the impact strength and high heat resistance of PET-PC blends without sacrifice in various other physical properties.

The polyethylene terephthalate suitable for use in the blends of this invention advantageously has an intrinsic viscosity of 0.4–2.1, preferably 0.7–1.0 as measured in a 60/40/phenol/tetrachloroethane mixture at 25°–30° C. The intrinsic viscosity can be obtained by employing the following equation:

$$[\eta] = [(ln \eta_r)/C]_{C=0}$$

wherein $\eta_r = \eta/\eta_o$ as described in the "Textbook of Polymer Science" by F. W. Billmeyer, Jr., Wiley-Interscience publication, 2nd Ed., 1962, p. 84. This polyester advantageously has a crystallinity in the range of 4–60 percent, preferably 30–50 percent.

The polyethylene terephthalate may be made by various well known methods. A typical procedure is as follows: Ethylene glycol (2.2 moles), dimethyl terephthalate (1 mole) and zinc acetate (0.05% by weight based on theoretical weight of polyester product) are reacted under normal pressure at 180°–190° C. for 2 hours. Then condensation is effected in an appropriate steel vessel heated by an external bath maintained at 280° C. The reactor is maintained at a reduced pressure of 0.5 mm. of Hg for 4 hours to produce the polyethylene terephthalate.

This polyethyleneterephthalate is composed of a recurring unit of the formula:

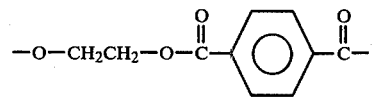

Also contemplated are mixtures of such polyesters with minor amounts, for example, from 0.5 to 2.5 percent by weight, of units derived from aliphatic or aromatic dicarboxylic acids and/or aliphatic or aromatic glycols.

The term "polycarbonate" as used herein is meant to embrace within its scope carbonate polymers of dihydric phenols. Such polycarbonate may be prepared by reacting a dihydric phenol with a carbonate precursor such as phosgene, a haloformate or a carbonate ester. In general, the resulting polycarbonate may be represented by recurring structural units of the formula:

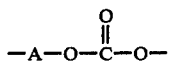

where A is a divalent aromatic radical derived from a dihydric aromatic compound, preferably bisphenol-A. These dihydroxy aromatic compounds are defined as 4,4'-dihydroxydi(mononuclear aryl)A compounds where the mononuclear aryl may be phenyl, tolyl, xylyl, ethylphenyl, isopropylphenyl, etc. and the connecting A groups may be —$CH_2$—, —$C_2H_4$—, —$C_3H_6$—, —$C_4H_8$—, —$SO_2$—, —S—, etc. Typical dihydride phenols are 2,2-bis(4-hydroxyphenyl) propane, bis-4-hydroxyphenyl) methane, hydroquinone, bis(4-hydroxyphenyl) sulfone, 2,2'-dihydroxydiphenylsulfone, bis(4-hydroxyphenyl) sulfide. Other suitable dihydric phenols are disclosed in U.S. Pat. No. 4,126,602. It is also possible to employ two or more different dihydric phenols for the preparation of the polycarbonate.

Polycarbonate suitable for use in the blends of this invention advantageously has an intrinsic viscosity of 0.35-1.0, preferably 0.45-0.75, as measured in methylene chloride at 25° C. using the same equation as given above.

The polycarbonate may be prepared by various well known procedures, such as described in "Chemistry and Physics of Polycarbonates" by Herman Schnell, Interscience Division of John Wiley and Company, New York (1964). A typical method is as follows: Over a period of about 2 hours phosphene is blown into bisphenol-A (4,4'-dihydroxyl-diphenyl-2,2-propane or p,p'-isopropylidenediphenol) in intimate contact with 9.8% aqueous caustic soda solution and methylene chloride. Phosgene is used in a proportion of 1.16 moles per mole of bisphenol-A and the caustic soda is used in a proportion of 2.8 moles per mole of bisphenol-A. After the addition of phosgene is completed, the reaction is continued for an additional 4 hours. Then the methylene chloride is evaporated from the reaction mass whereupon powdered polycarbonate is obtained.

A polycarbonate suitable for the practice of this invention is commercially available under the trademark "Lexan" (sold by General Electric). Another is available under the trademark "Merlon T4530" (sold by Mobay).

Copolyester suitable for use in the blends of this invention is prepared by well known esterification techniques, such as described in U.S. Pat. No. 3,390,132, using an appropriate mixture of ethylene glycol and cyclohexane-1,4-dimethanol with terephthalic acid or ester. The ethylene glycol and the cyclohexane-dimethanol may each comprise at least 10 mole percent with the mole percent of the combination totalling 100 mole percent for reaction with the terephthalic acid or ester.

The copolyester of terephthalic acid with ethylene glycol and cyclohexane-1,4-dimethanol has a recurring unit of the following formula:

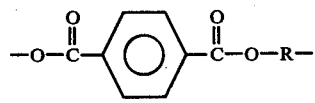

wherein the R represents the residue from the ethylene glycol and from the cis- or trans-isomer (or a mixture thereof) of the cyclohexane-1,4-dimethanol. The copolyester is prepared using an appropriate mixture of ethylene glycol and cyclohexane-1,4-dimethanol with terephthalic acid or ester. Of course, it is understood that the copolyester resin can contain minor amounts of other polyols or polycarboxylic acids. The copolyester advantageously has a glass transition temperature above room temperature, preferably between 50°-85° C. and has an intrinsic viscosity between 0.4 and 2.0, preferably between 0.5-1.2 dl/g, as measured in phenol/tetrachloroethane solution at 25°-30° C. A suitable copolyester of this invention is commercially available as Kodar 6763 (sold by Eastman Kodak). The Kodar 6763 has a glass transition temperature of about 81° C. as determined by Differential Scanning Calorimetry. It has a number average molecular weight of about 26,000.

As previously stated, it has been found that the aforementioned copolyester is particularly effective in improving the impact strength and high heat resistance of PET-PC blends without sacrifice of various other physical properties.

The blends of this invention may be prepared by blending the respective materials in various form such as powder, granular, flake, pellets or other forms of molding articles or various forms of melt shaped articles such as extruded or injection molded articles. Any of the methods well known to the art can be employed in the preparation of the blends of this invention. Illustrative techniques include co-extruding, dry blending and co-precipitation from solvent.

The compositions of this invention may be modified by minor amounts of one or more conventional additives such as heat and thermal stabilizers, lubricants and mold release agents, colorants including dyes and pigments, fibrous, flake and particulate fillers and reinforcements, nucleating agents and flame retardants, etc.

Heat stabilizers that may be used include sulfur compounds such as dilaurylthiopropionate and various phosphorous compounds. Suitable lubricant and mold release agents, for example up to 1.0 percent, include stearamide, oleamide, erucamide, AC copolymer 450A (Allied Chemical) and Emerby 1901A, etc. Thermal stabilizers such as tertiary-butylhydroquinone and Irgonox 1010 (Ciba-Geigy), etc., may be used. Suitable organic dyes include nigrosine, etc., the pigments, e.g., titanium dioxide, cadmium sulfide, carbon black, etc. Reinforcing materials based on the weight of the compositions may also be used, such as carbon fibers, glass fibers, amorphous silica, aluminum silica. The Nucleation agents include kaolin, mica powder, talc and sodium stearate, etc. Appropriate flame-retardants include oxides of some multivalent metals such as iron, tin, antimony and lead in combination with halogenated compounds such as decabromodiphenyl ether, Dechlorane Plus (Hooker Chemical), derivatives of halogenated bisphenol-A, etc.

The blends of this invention may be molded by the methods, equipment and conditions used for molding polyethylene terephthalate. They are particularly suitable for injection molding.

In molded blends of this invention, toughness is improved without sacrifice of crystallinity, flexural modulus, melting temperature and other desirable physical properties. Moreover there is less mold shrinkage and better dimensional stability. There is also improvement in high temperature aging and resistance to high humidity as shown by aging molded parts in an oven at 170° C. and in water at 50° C.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

In preparing the ternary blends of this invention, various known methods used for mixing materials of generally similar properties may be applied such as milling, extruding, etc. In the working examples described below, a 1½ inch extruder is used at temperatures of 250°-260°-260° C. with a screw speed of 60-70 rpm. In molding these blends the following injection molding conditions are used: feed speed setting at 3.5-4.0 scale; zero back pressure; barrel temperatures of 260°-285°-285° C.; and die temperatures of 60°-130° C. as indicated in the various examples.

EXAMPLE I

A series of various blends are prepared using a polyethylene terephthalate* having an intrinsic viscosity of 0.72 and a crystallinity of about 30%, a polycarbonate having the repeating unit structure —C-(O)OC$_6$H$_4$C(CH$_3$)$_2$C$_6$H$_4$O— and a glass transition temperature of 150° C., and a copolyester* comprising the terephthalate of a mixture of 20 mole percent ethylene glycol and 80 mole percent cyclohexane-1,4-dimethanol having a glass transition temperature of 81° C. and a number average molecular weight of 26,000. Each component is predried in a vacuum oven at 80°-95° C. for 12-16 hours. Then the blends are prepared in an extruder under the conditions described above. The copolyester (PETG) and the polycarbonate (PC) are advantageously mixed first and then added to the polyethylene terephthalate. Then molded parts are prepared from the blends by injection molding using the conditions also described above. Except for control runs, the various molding compositions have nucleating agents added which consist of 0.5% talc and 0.5% ionomer. The molded parts are subjected to various physical tests and the results are tabulated below in Table I.

*This is a commercial product sold by Goodyear under the Trademark "Cleartuf 7202A".
**This is a commercial product sold by General Electric under the trademark "Lexan 101".
***This is a commercial product sold by Eastman Kodak under the trademark "Kodar PETG 6763".

TABLE I

| Exp. No. | 1 | 1I | 2 | 3 |
|---|---|---|---|---|
| Proportions of PET/PETG/PC | 100/0/0 | 95/0/5 | 90/10/0 | 85/10/5 |
| Flex. Strength × 10$^{-3}$ (psi) | 15.84 break | 15.55 yield | 15.74 break | 15.45 yield |
| Flex. Mod × 10$^{-5}$ (psi) | 4.09 | 3.41 | 3.75 | 3.79 |
| Unnotched Izod ft-lb/in.$^2$ | 12.24 | 17.35 | 11.35 | 19.21 |
| Notched Izod ft-lb/in. | 0.52 | 0.67 | 0.52 | 0.63 |
| Crystallinity | 38.4 | 37.2 | 44.9 | 41.5 |
| Dimension of Molded Parts Thickness × Width (× 10$^{-3}$ inch) | 250×485 | 259×494 | 255×485 | 263×496 |

EXAMPLE II

The procedure of Example I is repeated except that the die temperature and time are changed from 90° C./0.5 min. to 130° C./1 min. The results are reported below in Table II.

TABLE II

| Exp. No. | Control* | I | II | 2 | 3 |
|---|---|---|---|---|---|
| Proportions of PET/PETG/PC | | 100/0/0 | 95/0/5 | 90/10/0 | 85/10/5 |
| Flex. Strength × 10$^{-3}$ (psi)break | 16.12 | 16.06 | 16.85 | 15.30 | 16.10 |
| Flex. Mod. × 10$^{-5}$ (psi) | 4.09 | 4.09 | 4.86 | 4.09 | 4.35 |
| Unnotched Izod ft-lb/in.$^2$ | 15.26 | 9.95 | 13.34 | 13.30 | 14.40 |
| Crystallinity | ** | 31.0 | 43.0 | 30.0 | 43.0 |
| Dimension of Molded Parts Thickness × Width (× 10$^{-3}$ inch) | | | | | |
| As Molded | 246 × 488 | 246 × 485 | 258 × 488 | 246 × 485 | 255 × 488 |
| In water at 50° C. for 1 week | 248 × 487 | 247 × 485 | 257 × 483 | 245 × 486 | 255 × 488 |
| In oven at 170° C. for 1 week | 246 × 485 | 247 × 485 | 258 × 484 | 244 × 485 | 252 × 485 |
| Aging effect on Flex. Strength of Molded Parts: | | | | | |
| As Molded (× 10$^{-3}$) psi | | 16.06 | 16.9 | 15.3 | 16.2 |
| After 24 hrs. in 50° C. water | | 15.94 | 15.68 | 15.2 | 16.5 |
| After 1 week in 50° C. water | | 15.5 | 15.2 | 15.4 | 16.1 |
| After 1 week in 170° C. oven | | 11.3 | 6.2 | 11.2 | 10.2 |
| After 4 weeks in 170° C. oven | | 6.7 | 5.6 | 6.5 | 8.2 |
| Exp. No. | | 1 | 1I | 2 | 3 |
| Proportions of PET/PETG/PC | | 100/0/0 | 95/0/5 | 90/10/0 | 85/10/5 |

TABLE II-continued

| | | | | |
|---|---|---|---|---|
| Aging effect on Flex. Mod. | | | | |
| As molded ($\times 10^3$) psi | 4.09 | 4.86 | 4.09 | 4.35 |
| After 24 hours in 50° C. water | 4.09 | 4.30 | 3.89 | 4.20 |
| After 1 week in 50° C. water | 3.90 | 4.40 | 3.80 | 4.09 |
| After 1 week in 170° C. oven | 4.3 | 4.7 | 4.3 | 4.6 |
| After 4 weeks in 170° C. oven | 4.4 | 5.1 | 4.6 | 4.9 |
| Aging effect on Unnotched Izod ft-lb/in.$^2$ | | | | |
| As molded | 9.95 | 13.34 | 13.30 | 14.40 |
| After 24 hrs. in 50° water | 16.05 | 14.00 | 14.11 | 18.14 |
| After 1 week in 50° water | 11.91 | 10.34 | 15.14 | 13.53 |

*Control same as I except no talc or ionomer present; all others have 0.5% talc and 0.5% ionomer.
**Amorphous skin with 65% crystallinity in center of part

EXAMPLE III

The procedure of Example I is repeated except that the die temperature and time are changed from 90° C./0.5 min. to 60° C./1 min. The results are as reported below in Table III.

TABLE III

| Exp. No. | Control* | I | II | 2 | 3 |
|---|---|---|---|---|---|
| Proportions of PET/PETG/PC | | 100/0/0 | 95/0/5 | 90/10/0 | 85/10/5 |
| Flex. Strength $\times 10^{-3}$ (psi) break | 14.59 | 16.65 | 14.74 | 15.12 | 13.68 |
| Flex. Mod. $\times 10^{-5}$ (psi) | 3.41 | 3.78 | 3.58 | 3.58 | 3.58 |
| Unnotched Izod ft-lb/in.$^2$ | 19.40 | 17.50 | 24.30 | 17.80 | 27.80 |
| Notched Izod ft-lb/in.$^2$ | | 0.57 | 0.67 | 0.63 | 0.64 |
| Crystallinity | | 37.0 | 43.0 | 22.0 | 47.0 |
| Dimension of Molded Parts Thickness $\times$ Width ($\times 10^{-3}$ inch) | | | | | |
| As Molded | 257 $\times$ 492 | 259 $\times$ 494 | 260 $\times$ 499 | 255 $\times$ 493 | 263 $\times$ 498 |
| In water at 50° C. for 1 week | 254 $\times$ 494 | 255 $\times$ 494 | 263 $\times$ 495 | 257 $\times$ 494 | 263 $\times$ 496 |
| In oven at 170° C. for 1 week | 248 $\times$ 488 | 238 $\times$ 487 | 261 $\times$ 495 | 247 $\times$ 487 | 262 $\times$ 494 |
| Aging effect on Flex. Strength of Molded Parts: | | | | | |
| As molded ($\times 10^{-3}$) psi | | 16.6 | 14.7 | 15.1 | 13.7 |
| After 1 week in 50° C. water | | 16.9 | 15.7 | 15.8 | 14.8 |
| After 3 weeks in 50° C. water | | 17.1 | 15.9 | 15.8 | 14.6 |

| Exp. No. | 1 | 11 | 2 | 3 |
|---|---|---|---|---|
| Proportions of PET/PETG/PC | 100/0/0 | 95/0/5 | 90/10/0 | 85/10/5 |
| Aging effect on Flex. Mod. | | | | |
| As molded ($\times 10^3$) psi | 3.78 | 3.58 | 3.58 | 3.58 |
| After 1 hour in 50° C. water | 4.09 | 3.75 | 3.75 | 3.75 |
| After 3 weeks in 50° C. water | 4.09 | 4.09 | 3.86 | 4.89 |
| After 1 week in oven at 170° C. | 4.9 | 5.1 | 4.3 | 5.1 |
| After 4 weeks in oven at 170° C. | 4.5 | 6.7 | 5.1 | 5.7 |
| Aging effect on Unnotched Izod ft-lb/in.$^2$ | | | | |
| As molded | 17.50 | 24.30 | 17.80 | 27.80 |
| After 24 hrs. in 50° water | 16.70 | 14.70 | 13.40 | 19.80 |

TABLE III-continued

|  |  |  |  |  |
|---|---|---|---|---|
| After 1 week in 50° water | 29.30 | 10.90 | 27.30 | 16.80 |

*Control same as I except no talc or ionomer present; all others have 0.5% talc and 0.5 ionomer.

EXAMPLE IV

A series of blends are prepared for testing the variations in properties effected by variations in the proportions of copolyester. The results are tabulated below in Table IV for a series of blends in which the amount of PET is decreased as the amount of PETG is increased, with the amount of PC maintained constant at 5 parts.

TABLE IV

| Exp. No. | 3 | 5 | 7 | 9 |
|---|---|---|---|---|
| Proportions of PET/PETG/PC | 85/10/5 | 75/20/5 | 65/30/5 | 55/40/5 |
| Flex. Strength $\times 10^{-3}$ (psi) | 15.45 | 14.49 | 12.48 | 13.06 |
| Flex. Mod. $\times 10^{-5}$ (psi) | 3.79 | 3.65 | 3.41 | 3.41 |
| Unnotched Izod ft-lb/in.$^2$ | 19.21 | 19.24 | 27.50 | 17.10 |
| Notched Izod ft-lb/in. | 0.63 | 0.61 | 0.53 | 0.70 |
| Crystallinity (%) | 41.5 | 25.7 | 10.3 | 7.0 |

EXAMPLE V

The procedure of Example IV is repeated except that the amount of PC is maintained at 7.5 parts with increasing amounts of PETG and decreasing amounts of PET. The results are reported below in Table V.

TABLE V

| Exp. No. | 1 | 2 | 3 |
|---|---|---|---|
| Proportions* of PET/PETG/PC | 92.5/0/7.5 | 88/75/3.75/7.5 | 77.5/15/7.5 |
| Flex. Strength $\times 10^{-3}$ (psi) | 16.3 | 15.7 | 14.7 |
| Flex. Mod. $\times 10^{-5}$ (psi) | 4.1 | 3.6 | 3.3 |
| Unnotched Izod, ft-lb/in$^2$ | 11.9 | 20.1 | 7.5 |
| Aging Effect: Flex. Str. after 48 hrs. at 170° C. ($\times 10^{-3}$ psi) | 15.8 | 17.1 | 13.8 |
| Unnotched Izod, ft-lb/in$^2$ after, 48 hrs. at 170° C. | 6.1 | 8.9 | 7.2 |

*All contain 0.5% talc and 0.25 AC copolymer 450A (sold by Allied Chemical)

EXAMPLE VI

A series of fiber glass filled blends are prepared for testing the effect of composition on mechanical properties. These blends contain 30 percent of 419AA fiber glass (Owens-Corning), 0.5 percent of talc, 0.2 percent of AC copolymer 450A (Allied Chemical), and 0.5 percent of Benzoflex (Velsicol Corporation). They are injection molded with barrel temperatures of 295°–290°–290° C. and die temperature/time of 90° C./30 sec. The testing results are tabulated in Table VI.

TABLE VI

| Exp. No. | 13 | 14 | 15 |
|---|---|---|---|
| Proportions of PET/PETG/PC | 100/0/0 | 95/5/0 | 92.5/5.0/2.5 |
| Flex. Strength $\times 10^{-3}$ (psi) | 35.52 | 35.37 | 35.86 |
| Flex. Mod. $\times 10^{-6}$ (psi) | 1.23 | 1.23 | 1.23 |
| Unnotched Izod, ft-lb/in$^2$ | 9.84 | 12.2 | 13.8 |
| Notched Izod, ft-lb/in$^2$ | 1.31 | 1.37 | 1.41 |
| Relative Toughness* | 100 | 113 | 122 |
| Flexural Bar Dimensions: Thickness thousandth inch | 248.8 | 256.6 | 256.3 |

*These values are calculated from the areas covered under the curve of tests for flexural strength of these samples and then normalized to 100 for Exp. No. 13.

EXAMPLE VII

The procedure of Example I is repeated a number of times with similar improved results using in place of the polycarbonate of that example corresponding proportions of polycarbonates having approximately 150° C. glass transition temperature and having the following repeating unit structures respectively:

|  | Derived from |
|---|---|
| (1) —C(O)OC$_6$H$_4$O— | Hydroquinone |
| (2) —C(O)OC$_6$H$_4$CH$_2$C$_6$H$_4$O— | Diphenylolmethane |
| (3) —C(O)OC$_6$H$_4$CH(CH$_3$)CH(CH$_3$)-C$_6$H$_4$O— | 2,3-Bis(4-hydroxyphenyl)-butane |
| (4) —C(O)OC$_6$H$_4$SC$_6$H$_4$O— | Bis(4-hydroxyphenyl)-sulfide |
| (5) —C(O)OC$_6$H$_4$SO$_2$C$_6$H$_4$O— | Bis(4-hydroxyphenyl)-sulfone |

While certain features of this invention have been described in detail with respect to various embodiments thereof, it will of course be apparent that other modifications can be made within the spirit and scope of this invention and it is not intended to limit the invention to the exact details shown except insofar as they are defined in the following claims.

The invention claimed is:

1. A polyethylene terephthalate blend having improved toughness in products molded therefrom, comprising a ternary blend comprising:
   a. 30–95 parts by weight of polyethylene terephthalate having an intrinsic viscosity of 0.7–1.0;
   b. 1–30 parts by weight of a polycarbonate of a 4,4'-dihydroxy-di(mononuclear aryl)-A compound, wherein the aryl is phenyl, tolyl, xylyl, ethylphenyl or isopropylphenyl and the A radical is —CH$_2$, —C$_2$H$_4$—, —C$_3$H$_6$—, —C$_4$H$_8$—, —S— or —SO$_2$—, said polycarbonate having an intrinsic viscosity of 0.45–0.75; and
   c. 2.5–10 parts by weight of a copolyester of terephthalic acid with 10–90 mole percent of ethylene glycol and 90-10 mole percent of cyclohexane-1,4-dimethanol;

the combined weight of said a, b and c totaling 100 parts by weight.

2. The blend of claim 1, in which said polyethylene terephthalate has a crytallinity of 5-70 percent.

3. The blend of claim 1, in which said polyethylene terephthalate comprises 35-95 parts by weight, said polycarbonate comprises 3-15 parts by weight and said copolyester comprises 2-20 parts by weight.

4. The blend of any of claims 1, 2 or 3 in which said polycarbonate comprises a polycarbonate of 4,4'-dihydroxydiphenyl-2,2-propane.

5. The blend of claim 4, in which said copolyester comprises 20-80 molar percent of ethylene glycol and 20-80 molar percent of cyclohexane-1,4-dimethanol.

6. The blend of claim 1, 2 or 3 in which said polyethylene terephthalate has a crystallinity of 15-50 percent.

7. The blend of any of claims 1, 2 or 3, in which said crystallinity is in the range of 30-50%.

8. A mixture of the blend of any of claims 1, 2 or 3, which also contains 5-50 percent by weight of a filler selected from the class of fiberglass, mica and amorphous silica, based on the combined weight of said blend and said fiberglass.

9. A mixture of claim 8, in which said filler is fiberglass.

10. A mixture of claim 9, which contains 20-50 percent by weight of said fiberglass.

11. A molded product of any of the blends of claim 1, 2 or 3.

12. A molded product of claim 11, produced by injection molding.

* * * * *

UNITED STATES PATENT AND TRADEMARK OFFICE
CERTIFICATE OF CORRECTION

PATENT NO. : 4,352,907
DATED : October 5, 1982
INVENTOR(S) : Chung J. Lee

It is certified that error appears in the above—identified patent and that said Letters Patent is hereby corrected as shown below:

Col. 2, line 5, delete "and 1-40 parts".

Col. 2, line 29, delete the "/" between "40" and "phenol".

Col. 9, line 47, correct "88/75/3.75/7.5" to read "88/4.5/7.5".

Col. 10, line 40, in the formula given in item (3) replace "CH(3)" with "CH(CH$_3$)" so that the entire formula will read "-C(O)OC$_6$H$_4$CH(CH$_3$)CH(CH$_3$)C$_6$H$_4$O-"

Signed and Sealed this

Eighteenth Day of January 1983

[SEAL]

Attest:

Attesting Officer

GERALD J. MOSSINGHOFF

Commissioner of Patents and Trademarks